(12) United States Patent
Yasui (10) Patent No.: US 8,992,129 B2
(45) Date of Patent: Mar. 31, 2015

(54) MARINE FENDER

(75) Inventor: Motohiro Yasui, Totsuka-ku (JP)

(73) Assignee: Bridgestone Corporation, Tokyo (JP)

( * ) Notice: Subject to any disclaimer, the term of this patent is extended or adjusted under 35 U.S.C. 154(b) by 487 days.

(21) Appl. No.: 13/367,638

(22) Filed: Feb. 7, 2012

(65) Prior Publication Data

US 2012/0201610 A1    Aug. 9, 2012

(30) Foreign Application Priority Data

Feb. 8, 2011  (JP) .................................. 2011-024905
Aug. 4, 2011  (JP) .................................. 2011-171251

(51) Int. Cl.
*E02B 3/26*    (2006.01)

(52) U.S. Cl.
CPC ...................................... *E02B 3/26* (2013.01)
USPC ......................................... 405/215; 405/212

(58) Field of Classification Search
USPC ................ 405/212–215; 114/219, 220; 14/76
See application file for complete search history.

(56) References Cited

U.S. PATENT DOCUMENTS 6,155,192 A * 12/2000 Yamaguchi .................... 114/219
6,187,420 B1 * 2/2001 Tajima et al. .................. 428/213

FOREIGN PATENT DOCUMENTS

| CN | 202559299 U | 11/2012 |
| JP | 58-006822 A | 1/1983 |
| JP | 11-036264 A | 2/1999 |
| JP | 11-050432 A | 2/1999 |
| JP | 11-093141 A | 4/1999 |
| JP | 11-93141 A | 4/1999 |
| JP | 2000-309914 A | 11/2000 |
| JP | 2001-271325 A | 10/2001 |
| JP | 2002-88738 A | 3/2002 |
| JP | 2002088738 A * | 3/2002 |
| JP | 2004156250 A * | 6/2004 |

OTHER PUBLICATIONS

Machine Translation of JP 2002-088738a.*
Machine Translation of JP 2004-156250a.*
Machine Translation of JP 2002-088738a, undated.*
Machine Translation of JP 2004-156250a, undated.*
Chinese Office Action, dated Dec. 18, 2013, issued in corresponding Chinese Patent Application No. 201210027367.3.
Japanese Office Action dated Jun. 10, 2014 issued in corresponding Japanese Patent Application No. 2011-024905.
Chinese Office Action, dated May 21, 2014, issued in corresponding Chinese Patent Application No. 201210027367.3.

* cited by examiner

*Primary Examiner* — Sunil Singh
(74) *Attorney, Agent, or Firm* — Sughrue Mion, PLLC (57) ABSTRACT

This invention relates to a marine fender being low and uniform in the compression surface pressure and excellent in the wear characteristics, and more particularly to a marine fender comprising a shock receiving portion 2 inclusive of a shock receiving resin board 4 and a pair of rubbery leg portions 3 disposed on the downside of the shock receiving portion 2 in a height direction of the fender, characterized in that a width W (mm) of the shock receiving portion 2 and a height H (mm) of the fender 1 satisfy a relation of the following equation (1);

$$2H \leq W \quad (1)$$

and a thickness $h_1$ (mm) of the shock receiving portion, a height $h_2$ (mm) of the leg portion, a thickness t (mm) of the leg portion and a height H (mm) of the fender satisfy a relation of the following equation (2);

$$h_2/4 \leq t \leq h_1 \leq H/2 \leq h_2 \quad (2).$$

8 Claims, 8 Drawing Sheets

MARINE FENDER

TECHNICAL FIELD

This invention relates to a marine fender, and more particularly to a marine fender being low and uniform in the compression surface pressure and excellent in the wear characteristics, and further to a marine fender which is small in the deterioration of the resistance to compression load even if a shock receiving board is worn and easy in the replacement with a new shock receiving board.

RELATED ART

Heretofore, marine fenders are attached to quay wall for protecting the quay wall and marine vessels from shock and wear when the marine vessel is berthed to quay of harbor, river, vessel repairing dock or the like. As such a fender is common a rubbery fender. However, rubber is high in the friction coefficient with iron mainly constituting an outer surface of the vessel (usually 0.4) and is worn by rubbing, scratching, chipping or the like based on the behavior of the vessel in shear direction. On the other hand, there is known a marine fender wherein a shock receiving face for receiving shock in the berthing of the vessel is coated with a hard resin having a friction coefficient with iron lower than that of rubber to prevent direct contact of rubber portion of the fender with the vessel.

For example, JP-A-2000-309914 (Patent Document 1) discloses a marine fender wherein a synthetic resin layer having a friction coefficient smaller than that of rubber is provided on a top surface contacting with the marine vessel. Also, JP-A-H11-93141 (Patent Document 2) discloses a marine fender comprising a rubbery fender body and a surface layer covering a shock receiving face of the fender body in which the surface layer is made from a polymer blend of a crystalline polyolefin resin and a highly unsaturated diene rubber.

Also, the vessel is subjected to reaction force from the marine fender during the contacting with the marine fender attached to the quay wall. There is known a marine fender wherein a leg portion is added to a back face of the shock receiving portion of the fender for reducing such a reaction force and a protrusion part shorter than the leg portion is disposed.

For example, JP-A-2002-88738 (Patent Document 3) discloses a marine fender comprising a shock receiving portion, a pair of first support portions connected to both sides of the shock receiving portion and a second support portion (protrusion part) connected to the center of the shock receiving portion.

PRIOR ART DOCUMENTS

Patent Documents

Patent Document 1: JP-A-2000-309914
Patent Document 2: JP-A-H11-93141
Patent Document 3: JP-A-2002-88738

DISCLOSURE OF THE INVENTION

Problems to be Solved by the Invention

Among the marine fenders attached to various places as mentioned above, fenders disposed onto quay walls of canal, narrow river, vessel repairing dock and the like are mainly used as a protection member for preventing direct contact of the vessel with the quay wall without main purpose of absorbing energy in the berthing of the vessel. In this case, the marine fender is required to have excellent wear characteristics rather than the performance of absorbing the energy in the berthing of the vessel.

Also, the fenders disposed onto the quay walls of the canal, narrow river, vessel repairing dock and the like are desirable to be low and uniform in the compression surface pressure (compression load/shock receiving area) generated by compressing the fender in the shear movement of the vessel from a viewpoint of the vessel protection.

It is, therefore, an object of the invention to solve the above problems of the conventional techniques and to provide a marine fender being low and uniform in the compression surface pressure and excellent in the wear characteristics.

Means for Solving the Problem

The inventor has made various studies in order to achieve the above object and found that in a marine fender comprising a shock receiving portion inclusive of a shock receiving board made from a resin and a pair of rubbery leg portions, when (1) a width W of the shock receiving portion and a height H of the fender have a specific relation and (2) a thickness $h_1$ of the shock receiving portion and a height $h_2$ of the leg portion and a thickness t of the leg portion and a height H of the fender have a specific relation, the compression surface pressure of the fender can be made low and uniform while improving the wear characteristics of the fender, and as a result, the invention has been accomplished.

That is, the marine fender of the invention comprises a shock receiving portion inclusive of a shock receiving board made from a resin and a pair of rubbery leg portions disposed on the downside of the shock receiving portion in a height direction of the fender, characterized in that a width W of the shock receiving portion and a height H of the fender satisfy a relation of the following equation (1);

$$2H \leq W \tag{1}$$

(wherein W is a width (mm) of the shock receiving portion and H is a height (mm) of the fender) and a thickness $h_1$ of the shock receiving portion, a height $h_2$ of the leg portion, a thickness t of the leg portion and a height H of the fender satisfy a relation of the following equation (2);

$$h_2/4 \leq t \leq h_1 \leq H/2 \leq h_2 \tag{2}$$

(wherein $h_1$ is a thickness (mm) of the shock receiving portion, $h_2$ is a height (mm) of the leg portion, t is a thickness (mm) of the leg portion and H is a height (mm) of the fender).

In a preferable embodiment of the marine fender of the invention, a thickness $T_1$ of the shock receiving board made from the resin is not less than 20 mm. In this case, excellent wear characteristics can be given to the marine fender over a long period of time.

In the marine fender of the invention, it is preferable that the shock receiving portion further includes a rubbery shock receiving board on the downside of the resin shock receiving board in the height direction of the fender. In this case, a contact area of the resin shock receiving board with the rubbery shock receiving board is made wider, and hence adhesiveness between the resin portion and the rubber portion in the fender can be made higher.

Moreover, when the shock receiving board in the above marine fender is worn away, it is required to replace the whole of the fender including the leg portion, and also there is a fear that the resistance to compression load is deteriorated to make the compression surface pressure non-uniform. Now, the inventor has made further investigation for the purpose of providing such a marine fender that the compression surface pressure is low and uniform and the deterioration of the resistance to compression load is small even if the shock receiving board is worn and further the replacement of the shock receiving board is easy, and found out that the marine fender comprising a shock receiving portion inclusive of shock receiving resin board and shock receiving rubber board and a pair of rubber leg portions and having (1) a specific relation between width W of the shock receiving portion and height H of the fender and (2) a specific relation among thickness $h_1$ of the shock receiving portion, height $h_2$ of the leg portion, thickness t of the leg portion and height H of the fender is further provided with a backup plate and a fastener member fastening the backup plate to the shock receiving portion, whereby the compression surface pressure of the fender can be made low and uniform while improving wear characteristics of the fender and the deterioration of the resistance to compression load is small even if the shock receiving resin board is worn and further the worn shock receiving resin board can be replaced easily.

Therefore, it is preferable that the marine fender of the invention comprises a shock receiving portion including a shock receiving resin board and a shock receiving rubber board disposed on the downside of the shock receiving resin board in a height direction of the fender, a pair of rubbery leg portions disposed on the downside of the shock receiving portion in the height direction of the fender, a backup plate disposed on the downside of the shock receiving portion in the height direction of the fender, and a fastener member fastening the shock receiving resin board, shock receiving rubber board and backup plate, wherein a width W of the shock receiving portion and a height H of the fender satisfy a relation of the following equation (1);

$$2H \leq W \quad (1)$$

(wherein W is a width (mm) of the shock receiving portion and H is a height (mm) of the fender) and a thickness $h_1$ of the shock receiving portion, a height $h_2$ of the leg portion, a thickness t of the leg portion and a height H of the fender satisfy a relation of the following equation (2);

$$h_2/4 \leq t \leq h_1 \leq H/2 \leq h_2 \quad (2)$$

(wherein $h_1$ is a thickness (mm) of the shock receiving portion, $h_2$ is a height (mm) of the leg portion, t is a thickness (mm) of the leg portion and H is a height (mm) of the fender).

In the marine fender of the invention, it is preferable that the backup plate has two or more fastening portions. In this case, the occurrence of deformation, rotation and the like of the backup plate can be prevented.

In another preferable embodiment of the marine fender of the invention, a ratio ($T_3/T_1$) of thickness $T_3$ of the backup plate to thickness $T_1$ of the shock receiving resin board is 1/6-1/1.

In the other preferable embodiment of the marine fender of the invention, the backup plate has a H-shaped or ladder form. In a still further preferable embodiment of the marine fender of the invention, the backup plates are arranged zigzag.

In the marine fender of the invention, it is preferable that the shock receiving resin board has a yield stress Ep of 20-35 MPa, the shock receiving rubber board has a Young's modulus Er of 1.5-8 MPa, the yield stress Ep of the shock receiving resin board and the Young's modulus Er of the shock receiving rubber board satisfy a relation of the following equation (3);

$$H/T_1 \leq 5 \times (Ep/Er)^{1/2} \quad (3)$$

(wherein H is a height (mm) of the fender, $T_1$ is a thickness (mm) of the shock receiving resin board, Ep is a yield stress (MPa) of the shock receiving resin board and Er is a Young's modulus (MPa) of the shock receiving rubber board). In this case, the shock receiving resin board can be sufficiently withdrawn to load in the buckling deformation by compression of the leg portion.

In the marine fender of the invention, it is further preferable that a protrusion is disposed on the downside of the shock receiving portion in the height direction of the fender and between the pair of leg portions. In this case, the breakage of the fender due to grappling of convex part of the vessel can be prevented surely. Also, even if the fastener member is disposed on the fender, compression exceeding a constant level is restricted by the protrusion, and hence the breakage of the fender by the fastener member can be prevented surely.

In a preferable embodiment of the marine fender of the invention, the shock receiving resin board is made from an ultrahigh molecular weight polyethylene (UHMW-PE). In this case, the wear resistance of the fender becomes very high.

Effect of the Invention

According to the invention, there can be provided a marine fender comprising a shock receiving portion inclusive of a shock receiving resin board and a pair of rubbery leg portions and having (1) a specific relation between width W of the shock receiving portion and height H of the fender and (2) a specific relation among thickness $h_1$ of the shock receiving portion, height $h_2$ of the leg portion, thickness t of the leg portion and height H of the fender, and being low and uniform in the compression surface pressure and excellent in the wear characteristics.

According to the invention, there can also be provided a marine fender comprising a shock receiving portion inclusive of a shock receiving resin board and a shock receiving rubber board, a pair of rubbery leg portions, a backup plate and a fastener member and having (1) a specific relation between width W of the shock receiving portion and height H of the fender and (2) a specific relation among thickness $h_1$ of the shock receiving portion, height $h_2$ of the leg portion, thickness t of the leg portion and height H of the fender, and being low and uniform in the compression surface pressure, small in the deterioration of the resistance to compression load even if the shock receiving portion is worn and easy in the replacement of the shock receiving board.

BEST MODE FOR CARRYING OUT THE INVENTION

Figure 2:
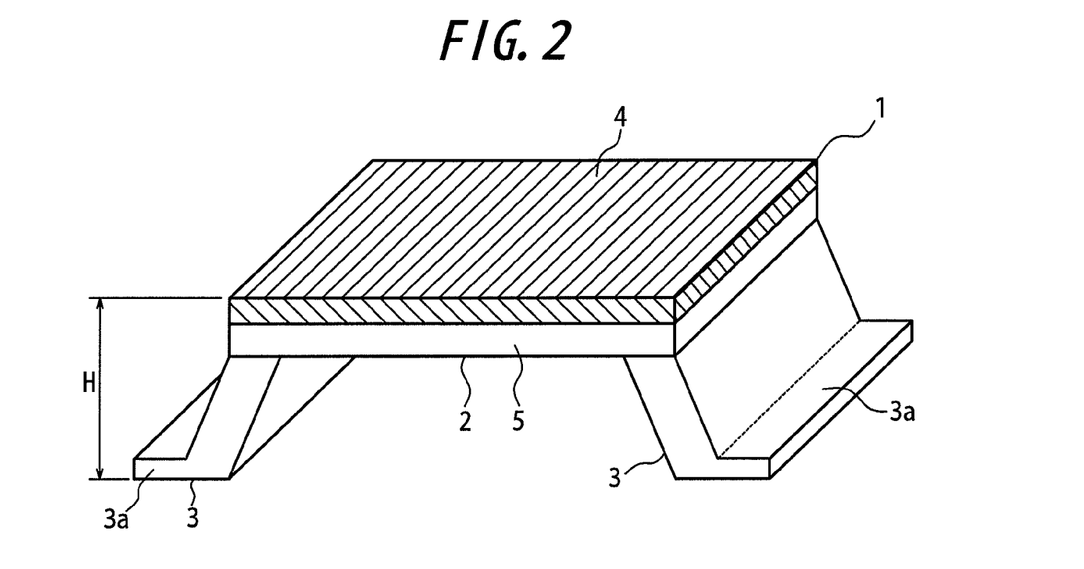
FIG. 2 is a perspective view of an embodiment of the marine fender of the invention.
Figure 3:
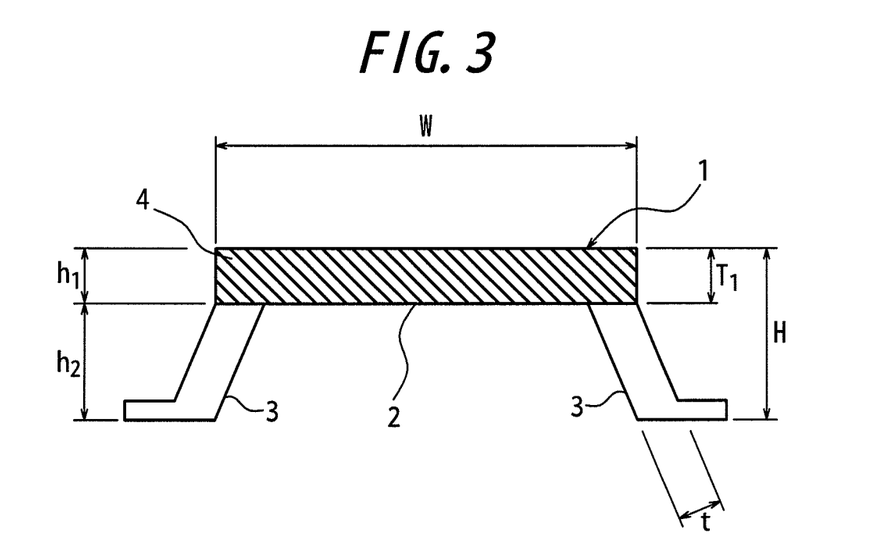
FIG. 3 is a section view of another embodiment of the marine fender of the invention.

The invention will be described in detail with reference to the accompanying drawings. A marine fender 1 shown in FIGS. 1 and 2 comprises a shock receiving portion 2 receiving shock in the berthing of a marine vessel and a pair of leg portions 3 attached to a lower face of the shock receiving portion 2. At this moment, the leg portion 3 is made from rubber, and a flange 3a for fixing the fender 1 to a quay wall or the like is provided on the leg portion 3. The shock receiving portion 2 in FIGS. 1 and 2 comprises a shock receiving board 4 made from a resin at a face contacting with the vessel (i.e. outermost face), and a shock receiving board 5 made from rubber and disposed on the downside of the shock receiving resin board 4 in a height direction of the fender (or thickness direction of the shock receiving board). Moreover, the shock receiving portion in the marine fender of the invention is sufficient to at least comprise the shock receiving resin board 4. In the shock receiving portion 2 of FIGS. 1 and 2, the shock receiving rubber board 5 receives only a large deformation during compression, so that when the adhesion between the rubber leg portion 3 and the shock receiving resin board 4 is ensued sufficiently, as shown in FIG. 3, the shock receiving portion 2 of the marine fender 1 can be constituted only by the shock receiving resin board 4 with the omission of the shock receiving rubber board 5. The shock receiving resin board 4 has a friction coefficient lower than that of the shock receiving rubber board 5 to iron mainly constituting an outer face of the vessel and can improve wear characteristics of the fender 1.

In the marine fender of the invention, the shock receiving resin board 4 is preferable to be made from a hard resin, and particularly preferable to be made from ultrahigh molecular weight polyethylene (UHMW-PE). In this case, the ultrahigh molecular weight polyethylene is preferable to have a weight average molecular weight of not less than 1,000,000. The ultrahigh molecular weight polyethylene is low in the friction coefficient to iron and is high in the effect of improving wear characteristics of the fender.

In the marine fender of the invention, any of rubber materials may be used in the rubber leg portion 3 and the shock receiving rubber board 5. As the rubber material may be used various rubber materials usually used in the conventional marine fender. For example, there may be used a rubber composition obtained by compounding a rubber component such as natural rubber (NR), styrene-butadiene rubber (SBR), butadiene rubber (BR), isoprene rubber (IR), ethylene-propylene-diene rubber (EPDM) or the like with a filler such as carbon black or the like, a vulcanizing agent such as sulfur or the like, and other additives.

In the marine fender 1 of the invention, a width W of the shock receiving portion 2 and a height H of the fender 1 satisfy a relation of the following equation (1):

$$2H \leq W \quad (1)$$

(wherein W is a width (mm) of the shock receiving portion and H is a height (mm) of the fender). Thus, the width W of the shock receiving portion 2 in the marine fender 1 of the invention is two times or more of the height H of the fender 1, so that the width W of the shock receiving portion 2 is wider than that of the conventional marine fender. Therefore, the marine fender 1 of the invention is wider in the shock receiving area, and can reduce compression surface pressure under compression load (compression load/shock receiving area).

Figure 4:
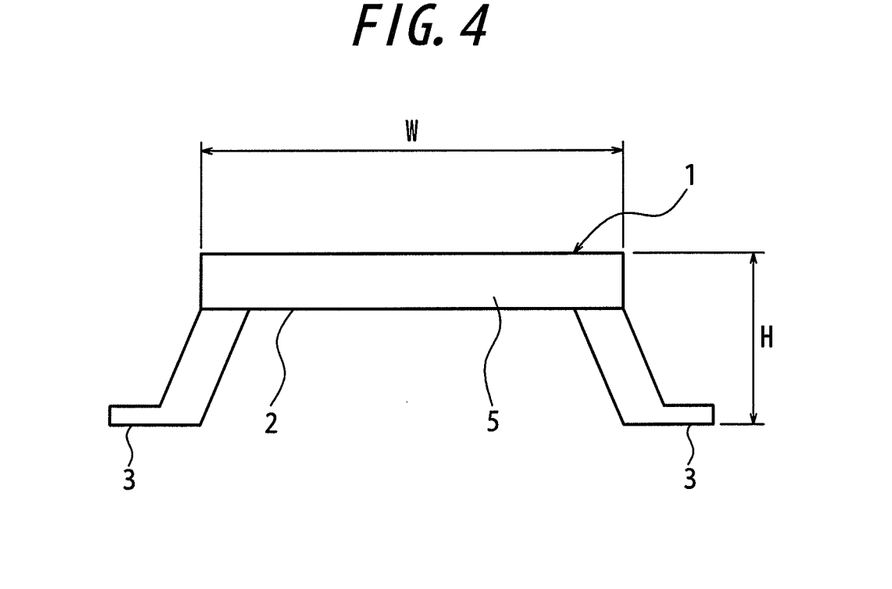
FIG. 4 is a section view of a marine fender having no shock receiving resin board.
Figure 5:
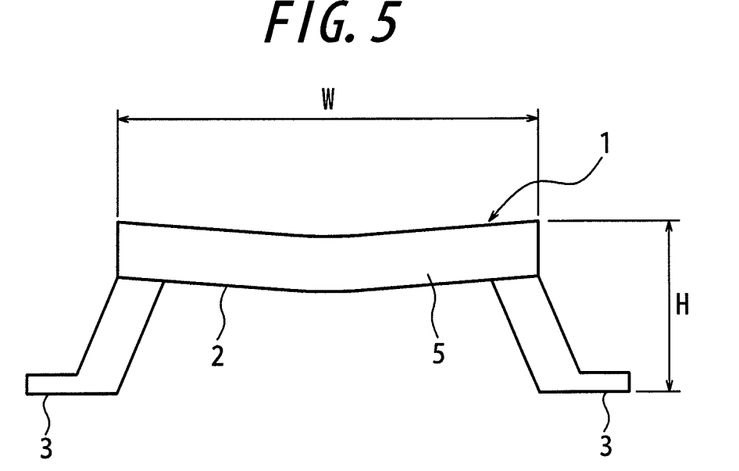
FIG. 5 is a section view of an example of the marine fender having no shock receiving resin board under compression load.

Moreover, when the shock receiving portion is made from rubber, i.e. when the shock receiving portion 2 is constituted by the shock receiving rubber board 5 as shown in FIG. 4, if the width W of the shock receiving portion 2 is wide and is not less than two times of the height H of the fender 1, as shown in FIG. 5, the central part of the shock receiving portion 2 falls down under compression load and stress generated in the compression concentrates in both side edges of the shock receiving portion 2, and hence the compression surface pressure is not uniform. In the marine fender 1 of the invention, however, the width W of the shock receiving portion 2 is wide and is made not less than 2 times of the height H of the fender 1 and also the shock receiving portion 2 includes the shock receiving resin board 4, so that the falling down of the central part of the shock receiving portion 2 under compression load can be prevented and the compression surface pressure can be made uniform.

In the marine fender 1 of the invention, the height $h_1$ of the shock receiving portion 2, height $h_2$ of the leg portion 3, thickness t of the leg portion 3 and height H of the fender 1 satisfy a relation of the following equation (2):

$$h_2/4 \leq t \leq h_1 \leq H/2 \leq h_2 \quad (2)$$

(wherein $h_1$ is a thickness (mm) of the shock receiving portion, $h_2$ is a height (mm) of the leg portion, t is a thickness (mm) of the leg portion and H is a height (mm) of the fender). If the thickness $h_1$ of the shock receiving portion 2 is thinner than the thickness t of the rubber leg portion 3 in the marine fender, the shock receiving portion 2 is first bent in the compression deformation, which deviates from a design idea of absorbing motion energy of vessel by deformation of the leg portion 3 and generates abnormal reaction force. As the thickness t of the leg portion 3 is smaller than the height $h_2$ of the leg portion 3, the behavior under compression become unstable, and the leg portion 3 is collapsed without being normally bent and hence normal compression characteristic can not be developed, so that the thickness t of the leg portion 3 is usually set to be not less than ¼ of the height $h_2$ of the leg portion 3. Also, when the thickness $h_1$ of the shock receiving portion 2 is thicker than a half of the height H of the fender 1, the deformation quantity of the leg portion 3 becomes small and motion energy of the vessel cannot be absorbed efficiently. Similarly, when the height $h_2$ of the leg portion 3 is lower than a half of the height H of the fender 1, the deformation quantity of the leg portion 3 becomes small, so that the height $h_2$ of the leg portion 3 is usually set to be not less than ½ of the height H of the fender 1.

In the marine fender 1 of the invention, the thickness $T_1$ of the shock receiving resin board 4 is preferably not less than 20 mm, more preferably 20-100 mm in view of quality characteristic in production. When the thickness $T_1$ of the shock receiving resin board 4 is not less than 20 mm, even if the shock receiving resin board 4 is worn by rubbing, scratching or the like, the time until it disappears is long, and hence excellent wear characteristics can be imparted to the marine fender 1 over a long period of time.

Figure 1:
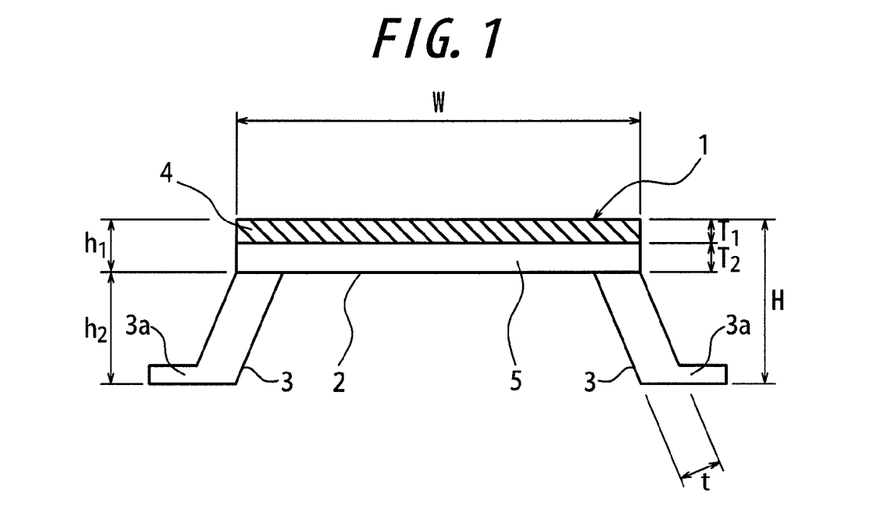
FIG. 1 is a section view of an embodiment of the marine fender of the invention.

In the marine fender 1 of the invention, it is preferable that the shock receiving portion 2 comprises a shock receiving board 4 made from a resin and a shock receiving board 5 made from rubber and disposed on the downside of the shock receiving resin board 4 in the height direction of the fender (i.e. in the thickness direction of the shock receiving board) as shown in FIG. 1. In this case, the contact area between the shock receiving resin board 4 and the shock receiving rubber board 5 is wide, so that the adhesion between resin portion and rubber portion in the fender can be made higher. Moreover, when the shock receiving portion 2 is constituted only with the shock receiving resin board 4 and a pair of leg portions 3 are disposed at the lower surface of the shock receiving resin board 4 as shown in FIG. 3, the contact area between the rubber leg portion 3 and the shock receiving resin board 4 becomes small, so that the adhesion between resin portion and rubber portion generally becomes lower as compared with the case that the shock receiving rubber board 5 is disposed at the lower surface of the shock receiving resin board 4.

Figure 6:
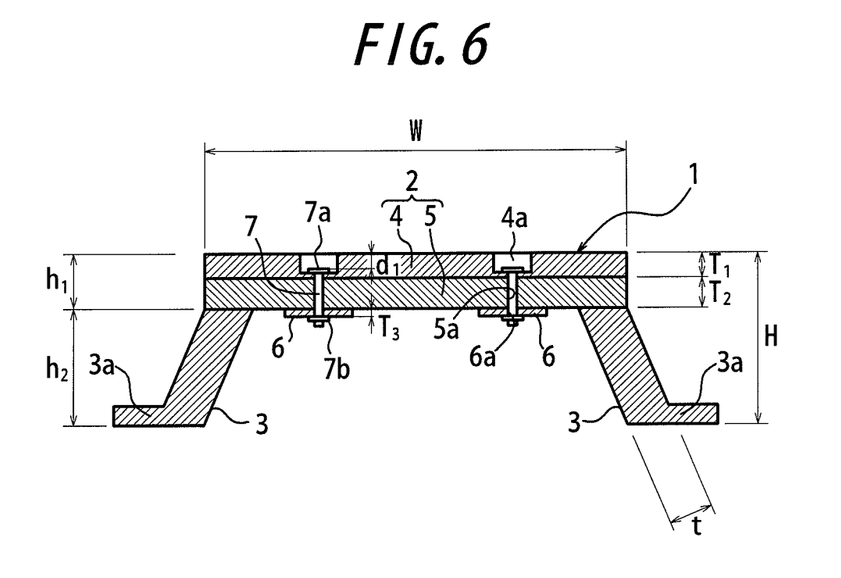
FIG. 6 is a section view of a preferable embodiment of the marine fender of the invention.
Figure 7:
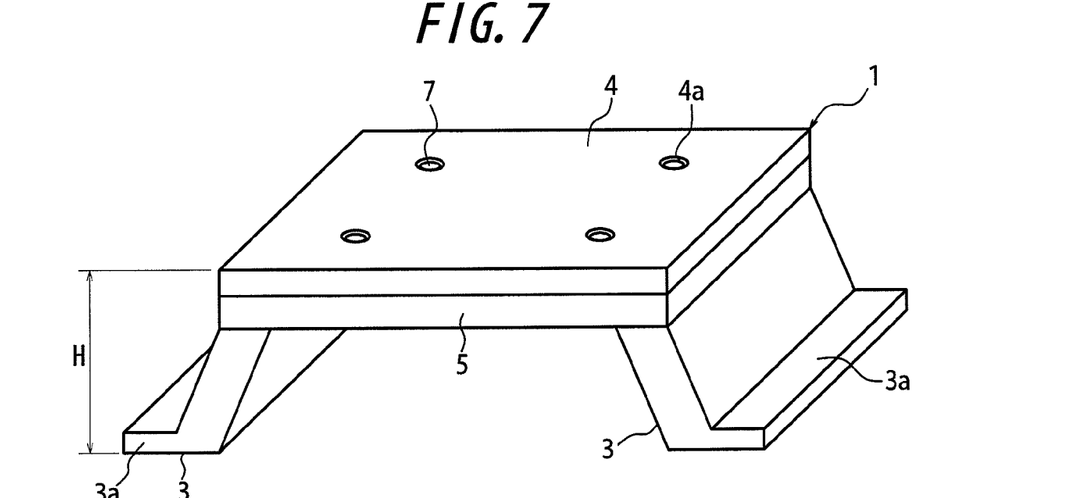
FIG. 7 is a perspective view of a preferable embodiment of the marine fender of the invention.
Figure 8:
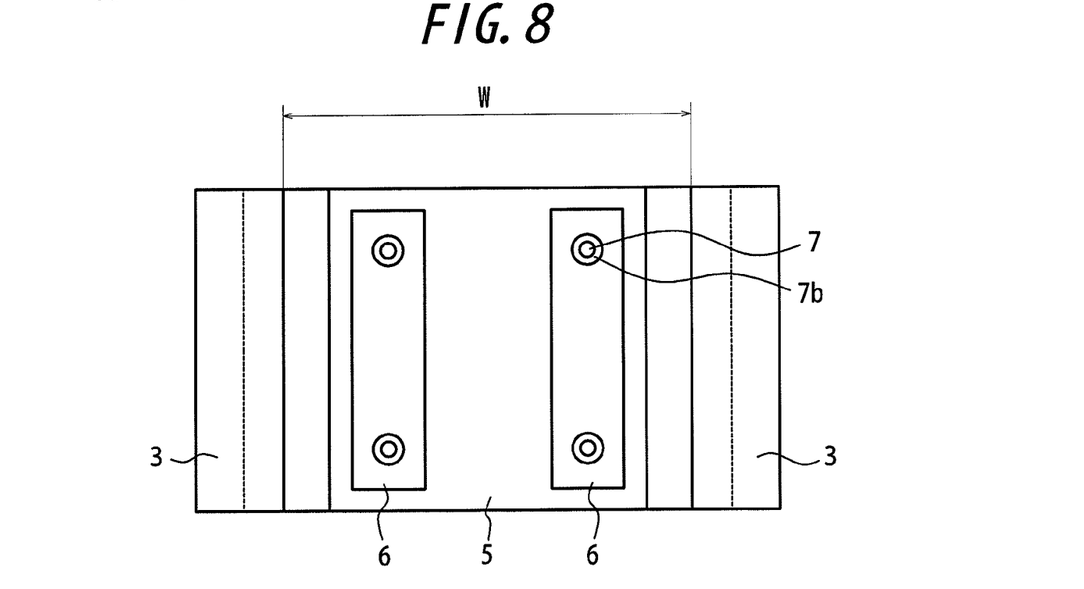
FIG. 8 is a bottom view of a preferable embodiment of the marine fender of the invention.

A preferable embodiment of the invention will be described in detail with reference to FIGS. 6, 7 and 8. FIG. 6 is a section view of a preferable embodiment of the marine fender of the invention, and FIG. 7 is a perspective view of the marine fender shown in FIG. 6, and FIG. 8 is a bottom view of the marine fender shown in FIG. 6. The marine fender 1 shown in FIGS. 6, 7 and 8 comprises a shock receiving portion 2 receiving shock in the berthing of a marine vessel, a pair of leg portions 3 disposed at the lower surface of the shock receiving portion 2, backup plates 6 disposed on the downside of the shock receiving portion 2 in a height direction of the fender and fastener members 7 fastening the backup plates 6 to the shock receiving portion 2.

In FIGS. 6, 7 and 8, the leg portion 3 is made from rubber, and also a flange 3a for fixing the fender 1 to quay wall or the like is formed in the leg portion 3. Also, the shock receiving portion 2 comprises a shock receiving board 4 made from a resin at its face contacting with the vessel (i.e. outermost face) and further a shock receiving board 5 made from rubber and disposed on the downside of the shock receiving resin board 4 in the height direction of the fender (i.e. thickness direction of the shock receiving board). In the marine fender shown in FIGS. 6, 7 and 8, the shock receiving rubber board 5 receives a large deformation during compression, while the shock receiving resin board 4 has a friction coefficient lower than that of the shock receiving rubber board 5 to iron mainly constituting the outer face of the vessel, so that the wear characteristics of the marine fender 1 can be improved.

In the marine fender 1 shown in FIGS. 6, 7 and 8, the backup plates are arranged on the downside of the shock receiving portion 2 in the height direction of the fender, so that even if the shock receiving resin board 4 is worn away, the backup plates are competitive with compression load, and hence the deterioration of the resistance to compression load can be prevented to prevent the large deformation and buckling of the marine fender. As the backup plate is preferable an iron plate in view of the durability and economic reasons.

The marine fender 1 shown in FIGS. 6, 7 and 8 is provided with fastener members 7. The fastener members 7 fasten the shock receiving resin board 4, the shock receiving rubber board 5 and the backup plates 6. When the shock receiving resin board 4 is worn away, the fastening by the fastener members 7 can be unfixed to detach the worn shock receiving resin board 4 and easily replace with another shock receiving resin board 4 (e.g. new product). As the fastener member 7 is preferable a combination of bolts 7a and nuts 7b as shown, for example, in FIG. 6.

Moreover, in order to fasten the shock receiving resin board 4, the shock receiving rubber board 5 and the backup plates 6 through the fastener members 7 in the marine fender 1 of FIGS. 6, 7 and 8, it is preferable that opening portions 4a, 5a and 6a are formed in the shock receiving resin board 4, the shock receiving rubber board 5 and the backup plates 6, respectively. Moreover, in order to restrict relative movement between the shock receiving board and the backup plate during shear compression, it is preferable that the opening portions 4a in the shock receiving resin board are arranged in two or more rows having plural constrained support points.

In the marine fender 1 shown in FIGS. 6, 7 and 8, it is preferable that a ratio $(T_3/T_1)$ of thickness $T_3$ of the backup plate 6 to thickness $T_1$ of the shock receiving resin board 4 is within a range of 1/6-1/1. When the ratio $(T_3/T_1)$ exceeds 1/1, if the thickness $T_1$ of the shock receiving resin board 4 is, for example, 20 mm, the thickness $T_3$ of the backup plate 6 should exceed 20 mm, which may be a factor of obstructing the compression deformation of the fender. Since the backup plate 6 plays a role as a reinforcing member after the disappearance of worn shock receiving resin board 4, the yield point (proof strength) of the backup plate made of iron plate is usually 210-400 MPa when the yield stress of the resin is within a range of 20-35 MPa, so that the ratio $(T_3/T_1)$ must not be less than 35/210=1/6 in order to bear the reinforcement exceeding the same stiffness. Moreover, a distance $d_1$ from an upper face of the shock receiving resin board 4 to an upper end of the fastener member 7 is preferable to be not less than 5 mm from a viewpoint of the service life of the shock receiving resin board 4.

As shown in FIG. 8, the backup plate 6 in the marine fender 1 of FIGS. 6, 7 and 8 is preferable to have plural fastening portions. Since the backup plate having only one fastening portion is rotatable, there is a fear of causing uneven wear of the shock receiving rubber board 5 due to the rotation of the backup plate. On the other hand, the backup plate 6 having plural fastening portions is impossible in the rotation and is firmly fixed, and hence the uneven wear of the shock receiving rubber board 5 is not caused.

In the marine fender 1 of the invention, the sock receiving resin board 4 is preferable to have a yield stress Ep of 20-35 MPa, while the shock receiving rubber board 5 is preferable to have a Young's modulus Er of 1.5-8 MPa. Also, it is preferable that the yield stress Ep of the shock receiving resin board 4 and the Young's modulus Er of the shock receiving rubber board 5 satisfy a relation of the following equation (3):

$$H/T_1 \leq 5 \times (Ep/Er)^{1/2} \tag{3}$$

(wherein H is a height (mm) of the fender, $T_1$ is a thickness (mm) of the shock receiving resin board, Ep is a yield stress (MPa) of the shock receiving resin board and Er is a Young's modulus (MPa) of the shock receiving rubber board).

In general, the resin is hardly deformed as compared with the rubber and is not restored beyond its yield point, so that it is preferable to be durable to a load F during compression deformation through compression of the leg portion. At this moment, assuming that the fender is an elastic deforming body and stands vertically, a load R in the buckling deformation of the leg portion 3 is represented by the following equation from Euler formula when both ends are free:

$$R = (\pi^2 \times Er \times Ir)/(h_2^2)$$

(wherein R is reaction force generated in the leg portion, Er is a Young's modulus of the leg portion (rubber), Ir is a second moment of area of the leg portion, and $h_2$ is a height of the leg portion).

Also, the maximum stress generated in the shock receiving portion 2 is represented by the following equation:

$$F = 2 \times R$$

$$(F \times W/4)/(2 \times Ip/T_1) \leq Ep$$

(wherein Ep is a yield stress of the shock receiving resin board, W is a width of the shock receiving portion, Ip is a second moment of area of the shock receiving resin board, and $T_1$ is a thickness of the shock receiving resin board) from bending stress through moment because it is preferable to be not more than the yield stress Ep of the shock receiving resin board 4. Even if the shock receiving rubber board 5 is disposed on the downside of the shock receiving resin board 4 in the height direction thereof, since the main object of the shock receiving rubber board 5 lies in the improvement of adhesion between the shock receiving resin board 4 and the rubber leg portion 3 and rubber is not yielded as compared with the resin, the rubber board does not contribute to the above calculating formula.

Setting the above equation through substitution as follows:

$$((\pi^2 \times Er \times Ir)/(h_2^2) \times W/4)/(Ip/T_1) \leq Ep$$

$$(\pi^2/4) \times (Ir/Ip) \times (W \times T_1/h_2^2) \times Er \leq Ep$$

$$(\pi^2/4) \times (t^3/T_1^3) \times (W \times T_1/h_2^2) \leq Ep/Er$$

Since the thickness $h_1$ of the shock receiving portion is not less than the thickness t of the leg portion and not more than ½ of the height H of the fender 1 and the width W of the shock receiving portion 2 is not less than 2 times of the height H of the fender 1, substituting $h_2/4 \leq t \leq h_1 \leq H/2 \leq h_2$ and $2H \leq W$ for the above, from $h_2/4 \leq t$ and $2H \leq W$ $$(\pi^2/4) \times ((h_2/4)^3/T_1^3) \times (2H \times T_1/h_2^2) \leq Ep/Er$$

$$(\pi^2/4) \times (h_2/4^3/T_1^2) \times (2H) \leq Ep/Er$$

from $H/2 \leq h_2$ $$(\pi^2/4) \times ((H/2)/4^3/T_1^2) \times (2H) \leq Ep/Er$$

$$(\pi^2/16^2) \times (H^2/T_1^2) \leq Ep/Er$$

$$H/T_1 \leq 16/\pi \times (Ep/Er)^{1/2}$$

since $16/\pi \approx 5$ $$H/T_1 \leq 5 \times (Ep/Er)^{1/2} \quad (3)$$

Therefore, when the relation of the equation (3) is satisfied, the shock receiving resin board 4 is durable to a load F in the buckling deformation through compression of the leg portion 3.

Moreover, the Young's modulus of rubber is usually a range of 1.5-8 MPa, and the yield stress of the resin is a range of 20-35 MPa. For example, when the yield stress of the ultrahigh molecular weight polyethylene (UHMW-PE) having a molecular weight of not less than 1,000,000 is 20 MPa and the Young's modulus of rubber is 5 MPa, substituting them for the equation (3) is $$H/T_1 \leq 5 \times (20/5)^{1/2} = 10$$

That is, the thickness $T_1$ of the shock receiving resin board should be not less than 1/10 of the height H of the fender 1. For example, when the marine fender has a height of 400 mm, the thickness of the shock receiving resin board must be not less than 40 mm.

Figure 9:
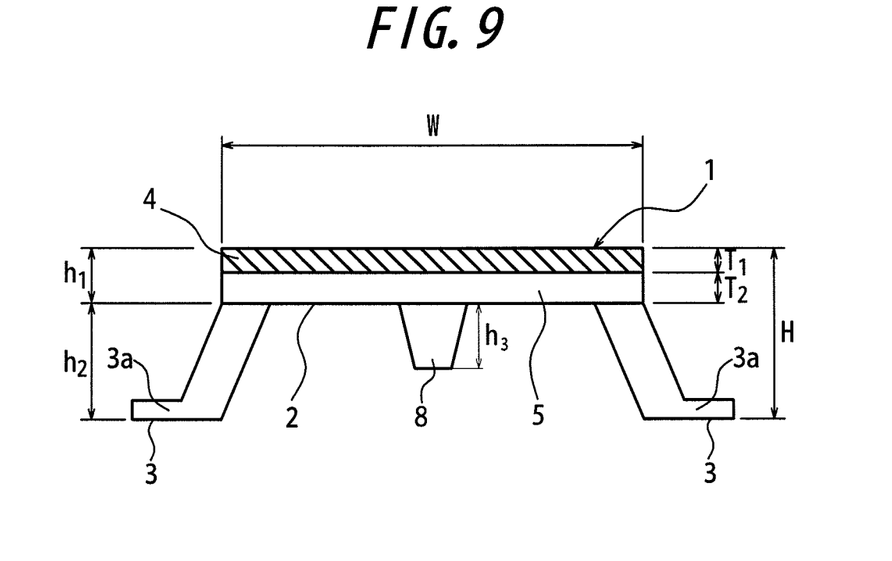
FIG. 9 is a section view of another preferable embodiment of the marine fender of the invention.
Figure 10:
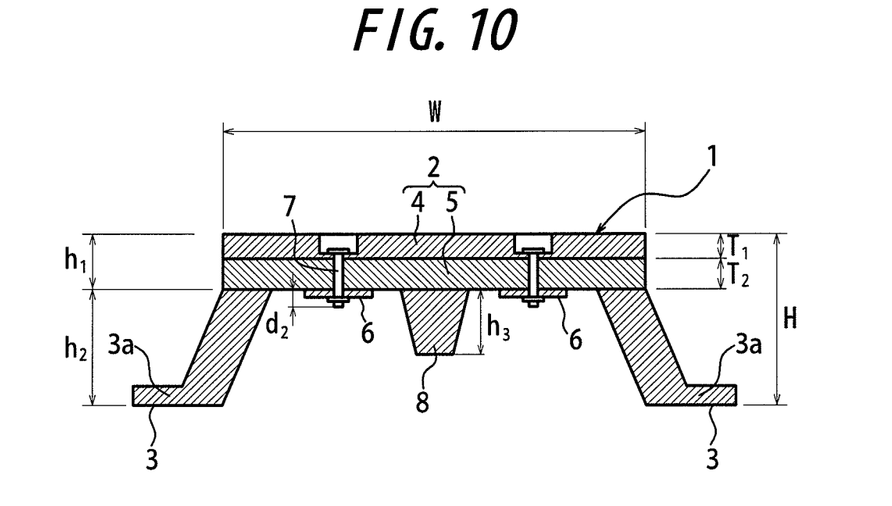
FIG. 10 is a section view of the other preferable embodiment of the marine fender of the invention.

In the marine fender of the invention, it is preferable that the shock receiving portion 2 is further provided with a protrusion 8 on the downside of the shock receiving portion 2 in the height direction of the fender and between the pair of the leg portions 3 as shown in FIGS. 9 and 10. When the vessel is moved under shear, the marine fender is compression-deformed to a certain deformed quantity once and subsequently subjected to shear load. In this case, there is no problem as long as the outer surface of the vessel is smooth, but convex portions by welding for joining steel sheets, pipe holes for discharging drains, relatively hard fenders attached to the vessel body and so on are really existent on the outer surface of the vessel. In the marine fender 1 of the invention, the height H of the fender is not more than a half of the width W of the shock receiving portion for realize the above reduction of the pressure as shown in the equation (1), so that the fender is designed so as to make the height H of the fender relatively low and the thickness t of the leg portion 3 relatively this as compared with the conventional fender. Therefore, it is considered that the fender 1 is broken if the fender 1 is caught by the convex portion of the vessel.

Figure 11:
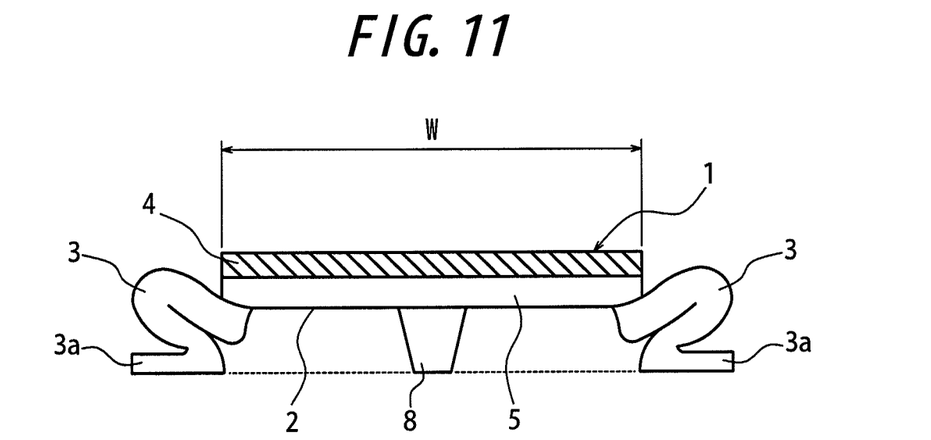
FIG. 11 is a section view of another preferable embodiment of the marine fender of the invention under compression load.
Figure 12:
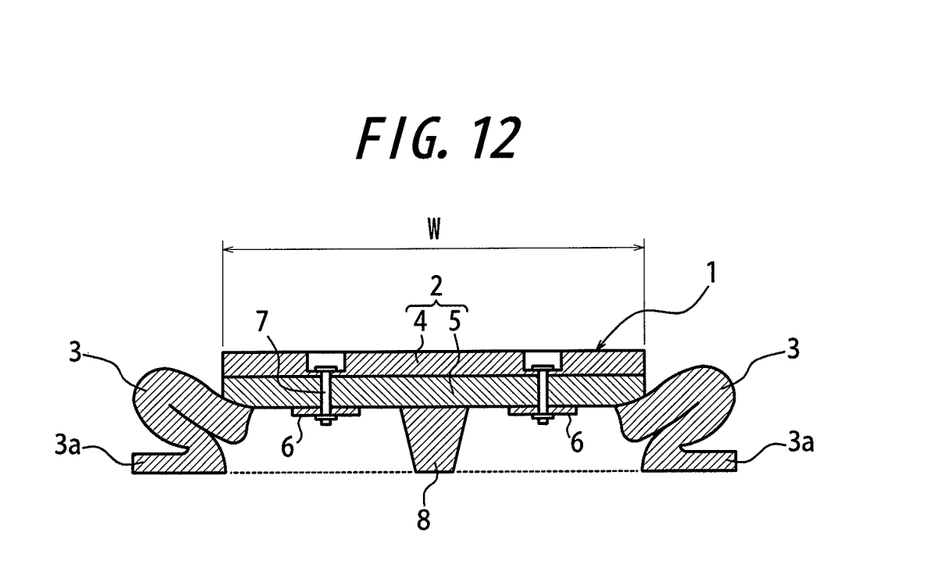
FIG. 12 is a section view of the other preferable embodiment of the marine fender of the invention under compression load.

In this connection, when the protrusion 8 is disposed on the downside of the shock receiving portion 2 in the height direction of the fender (i.e. thickness direction of the shock receiving board) and between the pair of the leg portions 3, after the fender 1 is compression-deformed to a given deformed quantity, as shown in FIGS. 11 and 12, the protrusion 8 disposed between the pair of the leg portions 3 contacts with the quay wall and the fender is supported by the protrusion 8, whereby drag to shear behavior is rapidly increased based on the friction coefficient between quay wall and rubber, and hence the breakage of the fender 1 by catching with the convex portion of the vessel can be prevented.

Although the protrusion 8 shown in FIGS. 9, 10, 11 and 12 has a trapezoidal shape in section, the cross-section shape of the protrusion 8 is not particularly limited. Also, in order that the leg portions 3 are deformed approximately equally, the protrusion 8 is preferable to be disposed substantially in a central part between the pair of the leg portions 3. Further, the height $h_3$ of the protrusion 8 in FIGS. 9 and 11 is not particularly limited as long as it is smaller than the height $h_2$ of the leg portion 3, and also the thickness of the protrusion 8 is not particularly limited. Moreover, the same rubber material as in the above rubber leg portion 3 and the shock receiving rubber board 5 is preferable to be used in the protrusion 8 of FIGS. 9, 10, 11 and 12.

The height $h_3$ of the protrusion 8 in FIGS. 10 and 12 is required to be larger than a distance $d_2$ from the bottom face of the shock receiving rubber board 5 to the lower end of the fastener member 7 and smaller than the height $h_2$ of the leg portion 3, preferably not more than ½ times of the height $h_2$ of the leg portion 3. Also, the width of the protrusion 8 is properly selected depending on the distance between the pair of the leg portions 3 and the width of the backup plate 6, and the length of the protrusion 8 is properly selected depending on the length of the fender 1. Moreover, when the marine fender 1 of the invention has the fastener members 7 and the protrusion 8, the fastener members 7 are preferable to be arranged in exposed portions of the shock receiving rubber board 5. For example, they are preferable to be arranged between the leg portion 3 and the protrusion 8.

Figure 13:
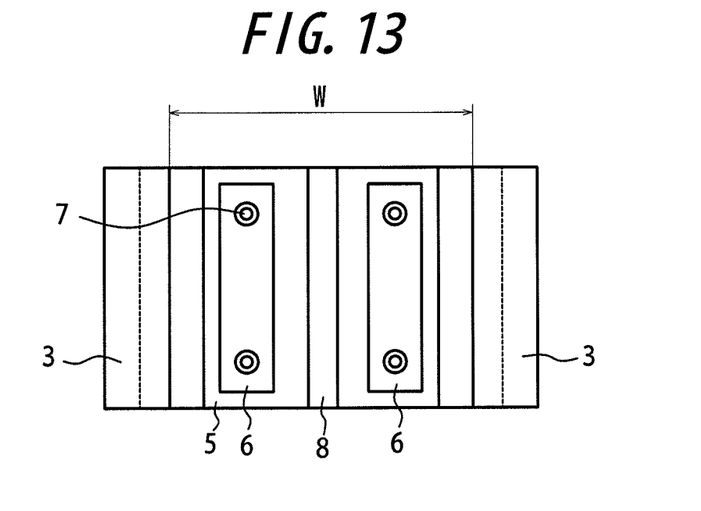
FIG. 13 is a bottom view of another preferable embodiment of the marine fender of the invention.
Figure 14:
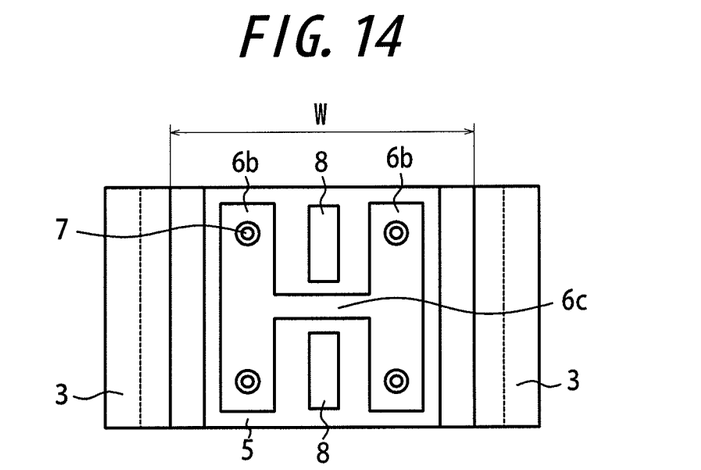
FIG. 14 is a bottom view of the other preferable embodiment of the marine fender of the invention.
Figure 15:
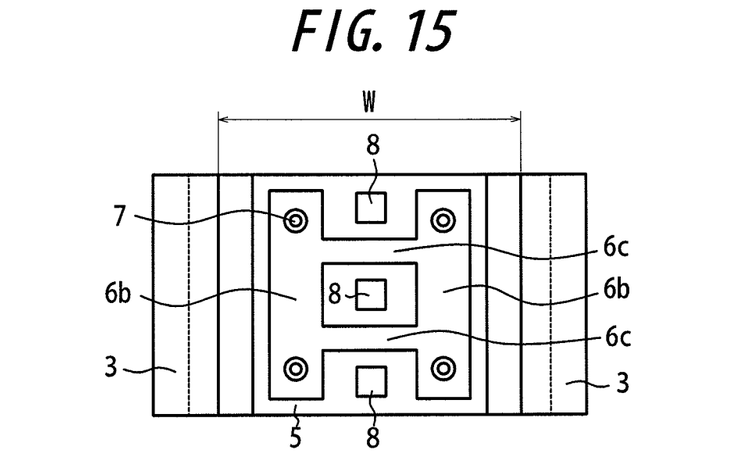
FIG. 15 is a bottom view of a further preferable embodiment of the marine fender of the invention.
Figure 16:
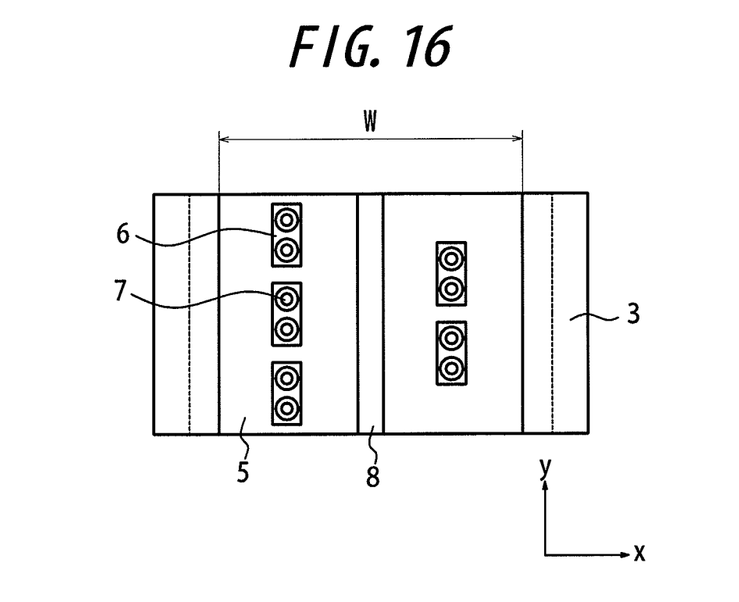
FIG. 16 is a bottom view of a still further preferable embodiment of the marine fender of the invention.

In case that the marine fender 1 of the invention has the backup plates 6 and the fastener members 7, the protrusion 8 may be continuous in the lengthwise direction of the fender as shown in FIGS. 13 and 16, or may be discontinuous as shown in FIGS. 14 and 15. Also, the shape of the backup plate 6 is preferable to be H-shaped as shown in FIG. 14 or ladder type as shown in FIG. 15 when the protrusion 8 is discontinuous. At this moment, the H-shaped backup plate 6 is comprised of two parallel-extended body portions 6b and one connect portion 6c connecting these body portions 6b as shown in FIG. 14, while the ladder type backup plate 6 is comprised of two parallel-extended body portions 6b and plural connect portions 6c connecting these body portions 6b. When the shape of the backup plate is H-shaped or ladder type, even if the shock receiving resin board 4 is worn, the deterioration of the resistance to compression load can be particularly made small.

Also, when the marine fender 1 of the invention has the backup plates 6 and the fastener members 7, as shown in FIG. 16, it is preferable that plural small-size backup plates 6 are arranged zigzag in the lengthwise direction of the fender. When the backup plates are arranged zigzag, backup plates made of iron plate or the like are existent on a line extending in x-direction of FIG. 16 at arbitrary points of y-direction of FIG. 16, so that there is no folding at a line parallel to the x-direction in the receiving of surface pressure. In case of continuous elongated backup plate, the stiffness is very large as compared with rubber or ultrahigh molecular weight polyethylene (UHMW-PE), so that it can not follow to the deformation and may be broken. Therefore, it is possible to surely solve such a fear by making the backup plate to small-size pieces and arranging these small size backup plates 6 zigzag.

The aforementioned marine fender of the invention is excellent in the wear characteristics and low and uniform in the compression surface pressure, so that it is particularly preferable as a fender attached to quay walls of canal, narrow river, vessel repairing dock and so on. Also, the marine fender having backup plates and fastener members according to a preferable embodiment of the invention is low in the deterioration of the resistance to compression load even if the shock receiving board is worn and easy in the replacement of the shock receiving board.

The invention claimed is:

1. A marine fender comprising a shock receiving portion including a shock receiving board made from a resin and a pair of rubbery leg portions disposed on the downside of the shock receiving portion in a height direction of the fender, wherein a width W of the shock receiving portion and a height H of the fender satisfy a relation of the following equation (1):

$$2H \leq W \quad (1)$$

(wherein W is a width (mm) of the shock receiving portion and H is a height (mm) of the fender) and a thickness $h_1$ of the shock receiving portion, a height $h_2$ of the leg portion, a thickness t of the leg portion and a height H of the fender satisfy a relation of the following equation (2):

$$h_2/4 \leq t \leq h_1 \leq H/2 \leq h_2 \quad (2)$$

(wherein $h_1$ is a thickness (mm) of the shock receiving portion, $h_2$ is a height (mm) of the leg portion, t is a thickness (mm) of the leg portion and H is a height (mm) of the fender), the shock receiving portion further comprises a shock receiving board made from rubber disposed on the downside of the shock receiving resin board in the height direction of the fender, the shock receiving resin board has a yield stress Ep of 20-35 MPa, the shock receiving rubber board has a Young's modulus Er of 1.5-8 MPa, and the yield stress Ep of the shock receiving resin board and the Young's modulus Er of the shock receiving rubber board satisfy a relation of the following equation (3):

$$H/T_1 \leq 5 \times (Ep/Er)^{1/2} \quad (3)$$

(wherein H is a height (mm) of the fender, $T_1$ is a thickness (mm) of the shock receiving resin board, Ep is a yield stress (MPa) of the shock receiving resin board, and Er is a Young's modulus (MPa) of the shock receiving rubber board).

2. A marine fender according to claim 1, wherein the shock receiving resin board has a thickness $T_1$ of not less than 20 mm.

3. A marine fender according to claim 1, which further comprises a backup plate(s) disposed on the downside of the shock receiving portion in the height direction of the fender and a fastener member fastening the shock receiving resin board, shock receiving rubber board and backup plate.

4. A marine fender according to claim 3, wherein a ratio ($T_3/T_1$) of thickness $T_3$ of the backup plate to thickness $T_1$ of the shock receiving resin board is 1/6-1/1.

5. A marine fender according to claim 3, wherein a shape of the backup plate is H-shaped or ladder.

6. A marine fender according to claim 1, which further comprises backup plates disposed on the downside of the shock receiving portion in the height direction of the fender and a fastener member fastening the shock receiving resin board, shock receiving rubber board and backup plates, wherein the backup plates are arranged zigzag.

7. A marine fender according to claim 1, wherein the shock receiving portion is further provided with a protrusion disposed on the downside of the shock receiving portion in the height direction of the fender and between the pair of the leg portions.

8. A marine fender according to claim 1, wherein the shock receiving resin board is made from ultrahigh molecular weight polyethylene.

* * * * *